QUADRATURE TYPE SOUND DETECTOR UTILIZING A VARIABLE BANDWIDTH RESONANT CIRCUIT

Filed June 28, 1965

INVENTOR.
JOHN J. SENNIK
BY [signature]
PATENT AGENT

United States Patent Office 3,389,216
Patented June 18, 1968

3,389,216

QUADRATURE TYPE SOUND DETECTOR UTILIZING A VARIABLE BANDWIDTH RESONANT CIRCUIT

John J. Sennik, Kitchener, Ontario, Canada, assignor to Dominion Electrohome Industries Limited, Kitchener, Ontario, Canada Filed June 28, 1965, Ser. No. 467,199
4 Claims. (Cl. 178—5.8)

ABSTRACT OF THE DISCLOSURE

The bandwidth of a resonant circuit comprising a capacitor and an inductance coil may be varied automatically by connecting a voltage dependent resistor in parallel with the coil and supplying a variable D.C. voltage to the voltage dependent resistor to vary the resistance thereof and hence the Q of the coil and the bandwidth of the resonant circuit.

This invention relates to resonant circuits provided with means responsive to a variable voltage for automatically varying the Q of the inductance coils of the resonant circuits. In a specific and preferred embodiment, this invention relates to an improved sound detector of the quadrature type for a television receiver.

The well known quadrature detector used for sound detection in television receivers and other electronic apparatus has several important shortcomings. Thus, if it is designed for good sound quality, it will have a poor signal to noise ratio. On the other hand, if it is designed for a good signal to noise ratio, it will have poor sound quality.

In accordance with one aspect of this invention, there is provided a quadrature detector or control circuit arranged such that the signal to noise ratio and bandwidth of the quadrature detector are variable dependent upon incoming signal strength. More specifically, the bandwidth and signal to noise ratio of a quadrature detector depends to a large extent on the Q value of the quadrature coil. If the Q is high, the detector will have a narrow bandwidth but good signal to noise ratio. If the Q is low, the detector will have a wide bandwidth but poor signal to noise ratio. In accordance with this aspect of the invention, there is provided a control circuit for a quadrature detector which permits the Q of the quadrature coil to be varied automatically with signal strength.

Figure 1:
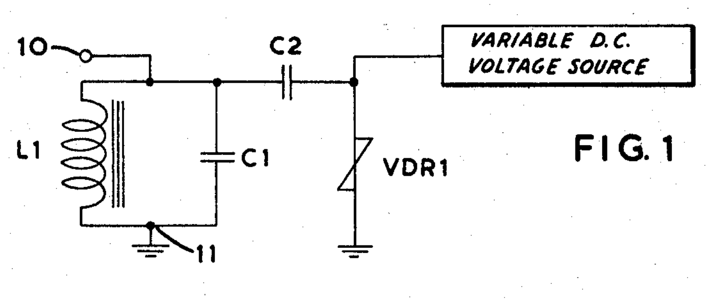
Figure 2:
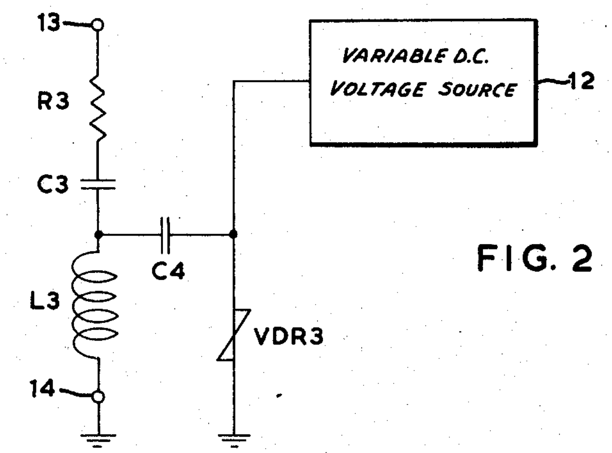
Figure 3:
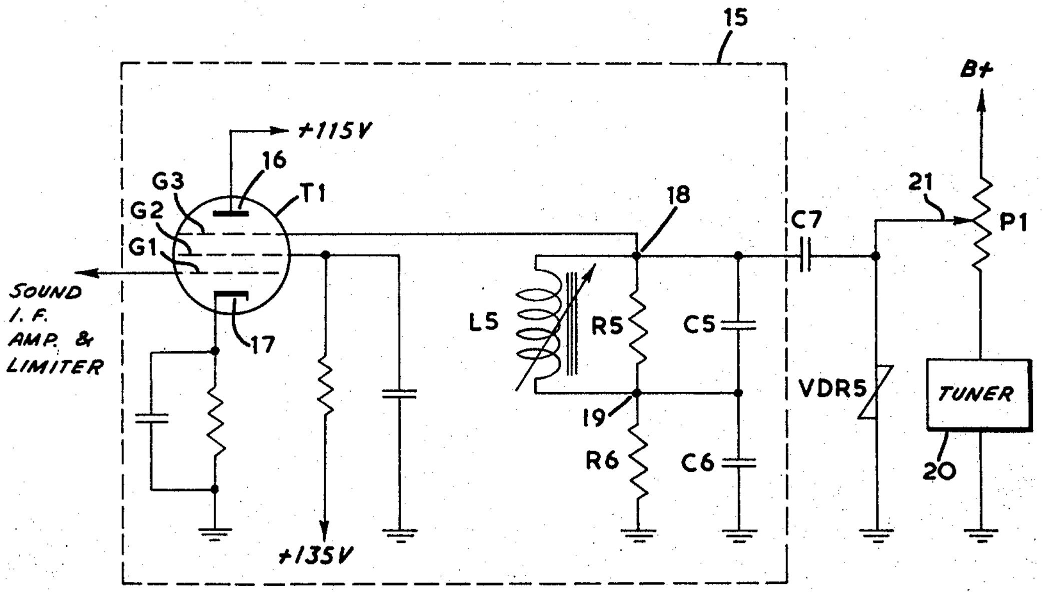

This invention will become more apparent from the following detailed description, taken in conjunction with the appendial drawings, in which:

FIGURE 1 shows a parallel resonant circuit having an inductance coil, the Q of which may be automatically varied by a variable control voltage, FIGURE 2 illustrates a series resonant circuit having an inductance coil, the Q of which may be automatically varied by a variable control voltage, and FIGURE 3 shows a quadrature detector for a television receiver and a circuit for automatically varying the Q of the quadrature coil in accordance with the strength of the intelligence containing signal received by the television receiver.

Referring to FIGURE 1, there is shown a parallel resonant circuit consisting of an inductance coil L1 and a capacitor C1 connected in parallel. The parallel resonant circuit has two terminals 10 and 11, the latter being connected to ground.

A variable D.C. voltage source 12 is provided and supplies a variable D.C. voltage to a voltage dependent resistor VDR1 connected in series between source 12 and ground. Connected between the ungrounded terminal of voltage dependent resistor VDR1 and the ungrounded terminals of inductance coil L1 and capacitor C1 is a blocking capacitor C2, which blocks the D.C. control voltage of source 12 from the parallel resonant circuit, and which connects voltage dependent resistor VDR1 in parallel with inductance coil L1. Capacitor C2 presents little impedance at the frequency to which the parallel resonant circuit is tuned.

In the operation of the circuit shown in FIGURE 1, if the D.C. control voltage from source 12 is low, the resistance of voltage dependent resistor VDR1 will be high, and the Q of inductance coil L1 will be high. Hence the parallel resonant circuit will have a good signal to noise ratio and narrow bandwidth. On the other hand, a higher D.C. voltage from source 12 will result in voltage dependent resistor VDR1 having a lower resistance, and the Q of inductance coil L1 being lower. Hence the parallel resonant circuit will have a poorer signal to noise ratio and a wider bandwidth.

In FIGURE 2 there is shown a series resonant circuit consisting of a resistor R3, a capacitor C3 and an inductance coil L3 connected in series between two terminals 13 and 14, the latter of which is grounded.

A variable D.C. voltage source 12 is provided and supplies a variable D.C. voltage to a voltage dependent resistor VDR3, which, in turn, is connected in parallel with inductance coil L3 by a D.C. blocking capacitor C4, the latter being connected to the ungrounded terminals of voltage dependent resistor VDR3 and inductance coil L3.

By varying the D.C. control voltage from source 12, one can automatically vary the Q of inductance coil L3.

In FIGURE 3 there is shown a typical sound detector 15 of the quadrature type for a television receiver. The detector includes a pentode T1 having an anode electrode 16, cathode electrode 17 and three grid electrodes G1, G2, G3. The signal from the sound I.F. amplifier and limiter is applied to grid G1, while grid G3 is connected to a terminal 18 of a parallel resonant circuit consisting of a variable inductance coil L5 (quadrature coil), a capacitor C5 and a resistor R5 connected in parallel with each other. The other terminal 19 of the parallel resonant circuit is connected to ground through a resistor R6 and a capacitor C6 connected in parallel with each other. Resistor R6 and capacitor C6 raise the impedance of the parallel resonant circuit without affecting the Q of quadrature coil L5. The parallel resonant circuit is tuned to a frequency of 4.5 mcs.

In accordance with a preferred embodiment of this invention, there is provided a circuit for automatically varying the Q of quadrature coil L5 in accordance with variations in the strength of the intelligence containing signal received by the television receiver. One circuit for performing this function is shown in FIGURE 3 and consists of a D.C. blocking capacitor C7, a voltage dependent resistor VDR5 and the B+ dropping potentiometer P1 for the tuner 20 of the television receiver.

One terminal of voltage dependent resistor VDR5 is grounded, while the other terminal is connected to terminal 18, via blocking capacitor C7, which is virtually a short circuit at 4.5 mcs. Thus, capactor C7 and resistor R6 connect voltage dependent resistor VDR5 in parallel with quadrature coil L5.

It will be apreciated by those skilled in the art that the D.C. voltage picked up by slider 21 of potentiometer P1 varies in accordance with the strength of the signal being received by the television receiver and, as shown in FIGURE 3, is supplied to voltage dependent resistor VDR5. Other sources of a D.C. voltage varying in accordance with signal strength, e.g., any voltage source dependent on A.G.C. may be employed in place of B+ dropping potentiometer P1 to tuner 20.

In the operation of the circuit shown in FIGURE 3, when the received signal is low, which results in low B+, voltage dependent resistor VDR5 will have a high resistance, and the Q of coil L5 will be high. Thus the parallel resonant circuit and quadrature detector will have a good signal to noise ratio and a narrow bandwidth. When the strength of the incoming signal is higher, which means higher B+, the resistance of voltage dependent resistor VDR5 will be lower, and the Q of coil L5 also will be lower. Thus, the parallel resonant circuit and quadrature detector will have a wider bandwidth and a poorer signal to noise ratio, but the latter is not so objectionable because the signal strength is higher.

This invention also may be practised in the I.F. stage of conventional A.M. receivers.

While preferred embodiments of this invention have been disclosed herein, those skilled in the art will appreciate that changes and modifications may be made therein without departing from the spirit and scope of this invention as defined in the appended claims.

The embodiments of the invention in which an exclusive property or privilege is claimed are defined as follows:

1. In a television receiver having a sound detector of the quadrature type including a parallel resonant circuit comprising a capacitor and an inductance coil, the improvement which comprises means for automatically varying the Q of said inductance coil in accordance with the strength of the intelligence containing signal received by said television receiver, said means comprising a voltage dependent resistor, means connecting said voltage dependent resistor in parallel with said inductance coil, means for providing a D.C. voltage which varies in accordance with the strength of the intelligence containing signal received by said television receiver, and means for supplying said D.C. voltage to said voltage dependent resistor to vary the resistance thereof in response to variations in said D.C. voltage and thereby vary the Q of said inductance coil.

2. The invention according to claim 1 wherein said means connecting said voltage dependent resistor in parallel with said inductance coil includes a blocking capacitor, said blocking capacitor being adapted to block said D.C. voltage from said parallel resonant circuit.

3. In a television receiver having a sound detector of the quadrature type including a parallel resonant circuit comprising a first capacitor, a first resistor and an inductance coil all connected in parallel with each other, and a second resistor and a second capacitor connected in parallel with each other and in series with said parallel resonant circuit, the improvement which comprises means for automatically varying the Q of said inductance coil in accordance with the strength of the intelligence containing signal received by said television receiver, said means comprising a voltage dependent resistor, means connecting said voltage dependent resistor in parallel with the series circuit including said inductance coil and said second resistor, means for providing a D.C. voltage which varies in accordance with the strength of the intelligence containing signal received by said television receiver, and means for supplying said D.C. voltage to said voltage dependent resistor to vary the resistance thereof in response to variations in said D.C. voltage and thereby vary the Q of said inductance coil.

4. The invention according to claim 3 wherein said means connecting said voltage dependent resistor in parallel with said series circuit includes a blocking capacitor, said blocking capacitor being adapted to block said D.C. voltage from said parallel resonant circuit.

References Cited

UNITED STATES PATENTS

| | | | |
|---|---|---|---|
| 2,774,866 | 12/1956 | Burger | 325—319 |
| 3,038,072 | 6/1962 | Proudfit. | |

OTHER REFERENCES

Turner, Semiconductor Devices, pp. 25–30 and pp. 200–203, received in Scientific Library Oct. 9, 1961; copy in Group 233.

ROBERT L. GRIFFIN, *Primary Examiner.*

JOHN W. CALDWELL, *Examiner.*

R. L. RICHARDSON, *Assistant Examiner.*